United States Patent [19]

Umeda et al.

[11] Patent Number: 4,746,196

[45] Date of Patent: May 24, 1988

[54] MULTIPLEXED DRIVING METHOD FOR AN OPTICAL SWITCHING ELEMENT EMPLOYING FERROELECTRIC LIQUID CRYSTAL

[75] Inventors: Takao Umeda, Mito; Tetsuya Nagata; Yuzuru Simazaki, both of Hitachi; Tatsuo Igawa, Kitaibaraki; Yasuro Hori, Katsuta, all of Japan

[73] Assignee: Hitachi, Ltd., Tokyo, Japan

[21] Appl. No.: 46,171

[22] Filed: May 5, 1987

[30] Foreign Application Priority Data

May 9, 1986 [JP] Japan ............................... 61-104620

[51] Int. Cl.$^4$ .......................... G02F 1/13; G09G 3/00

[52] U.S. Cl. ................................ 350/332; 350/350 S; 350/333; 340/805

[58] Field of Search .................... 350/350 S, 332, 333; 340/805

[56] References Cited

U.S. PATENT DOCUMENTS 4,186,395 1/1980 Fujita et al. ........................ 350/332

FOREIGN PATENT DOCUMENTS 0149398 12/1984 European Pat. Off. .

OTHER PUBLICATIONS

J. M. Geary, "A Multiplexed Ferroelectric LCD Using AC Field-Stabilized States", SID 1985 Digest, pp. 128-130.

Pesant, "Ferroelectric Optical Switching or Chiral Smectic C Liquid Crystal Mixtures", Euro Display, 84 (4th International Display Research Conference Proceeding) 1984, 9, 18-20, pp. 217-220).

*Primary Examiner*—Stanley D. Miller
*Assistant Examiner*—Trong Q. Phan
*Attorney, Agent, or Firm*—Antonelli, Terry & Wands

[57] ABSTRACT

A multiplexed driving method of an optical switching element employing ferroelectric liquid crystal with a negative dielectric anisotropy including signal electrodes and common signal electrodes arranged in matrix and a ferroelectric liquid crystal layer disposed therebetween so as to constitute pixels at the respective facing portions of the signal electrodes and the common signal electrodes comprising a step of applying a common writing signal voltage to one of the common signal electrode to select pixels to which information be written, simultaneously applying a common status holding AC signal voltage to the other common signal electrodes covering non-selected pixels and simultaneously applying one of two signal pulses with opposite polarities to the signal electrodes, whereby resultant information writing voltages formed in combination of the common writing signal voltage and the signal pulses, which are enough to determine the orientation of the ferroelectric liquid crystal molecules, are applied on the selected pixels and resultant AC status holding voltage formed in combination of the common status holding AC signal voltage and the signal pulses which determine the limited bias voltage for the resultant AC voltage are applied on the non-selected pixels.

10 Claims, 4 Drawing Sheets

MULTIPLEXED DRIVING METHOD FOR AN OPTICAL SWITCHING ELEMENT EMPLOYING FERROELECTRIC LIQUID CRYSTAL

The present invention relates to a multiplexed or a time shared driving method for an optical switching element employing ferroelectric liquid crystal having a negative dielectric anisotropy and being suitable to an optical display device and particularly to a light shutter array or an optical switch array for a line printer.

BACKROUND OF THE INVENTION

Conventional driving methods for the optical switching element employing ferroelectric liquid crystal with a negative dielectric anisotropy and used for the optical display devices are disclosed in EP-A- No. 0149398 published on July 24, 1985 and in J. M. Geary "8.3: A Multiplexed Ferroelectric LCD Using ac Field-Stabilized States" (pp 128–130, SID 85 DIGEST, 1985).

The optical switching element of EP-A- No. 0149398 is formed of a plurality of row and column electrodes arranged in matrix and a ferroelectric liquid crystal layer disposed therebetween. The portions of the ferroelectric liquid crystal layer sandwiched between the row and column electrodes constitute unit pixels (optical switch units) of the optical switching element. Driving of the optical switching element is performed such that when an information, for example bright or dark, is desired to be written on a selected pixel, zero voltage is applied on the row electrode corresponding to the selected pixel and a predetermined DC voltage to cause a desired ferroelectric liquid crystal molecule orientation is applied on the column electrode corresponding to the selected pixel and when a written information on a specific non-selected pixel, i.e. ON or OFF optical status, is desired to be maintained or held, an AC voltage with a predetermined amplitude and frequency is applied to the row electrode corresponding to the specific non-selected pixel and a predetermined DC voltage applied previously to cause the ON or OFF optical status is removed. Since a predetermined DC voltage is applied to a selected pixel through a column electrode corresponding thereto, the same DC voltage is also applied on non-selected pixels covered by the common column electrode, although the AC voltages are respectively applied to the row electrodes corresponding to the non-selected pixels. For some non-selected pixels, the applied DC voltage could be a DC voltage having an opposite polarity with the same amplitude to the DC voltage applied previously to change the ferroelectric liquid crystal molecule orientation, as a result, the molecule orientation of the non-selected pixel could be changed unwantedly even with the AC voltage application on the row electrodes so that a contrast of the optical switching element is reduced.

The structure of the optical switching element of J. M. Geary is substantially the same as that of EP-A- No. 0149398 explained above. However the driving method of J. M. Geary element is somewhat different from that of EP-A- No. 0149398, in that when an information, for example ON or OFF optical status, is desired to be written on a selected pixel, a bipolar pulse for causing a desired ferroelectric liquid crystal molecule orientation is applied on the selected pixel through a column electrode corresponding to the selected pixel while a steady AC voltage is applied on all of the pixels through the row electrodes even in the information writing period. Since all of the pixels of J. M. Geary are applied the AC voltage throughout the driving operation, a bipolar pulse with a large amplitude has to be applied to the selected pixel through a column electrode to change the ferroelectric liquid crystal molecule orientation therein with in a predetermined switching time.

SUMMARY OF THE INVENTION

An object of the present invention is to provide a multiplexed driving method of an optical switching element employing ferroelectric liquid crystal with a negative dielectric anisotropy wherein a reverse biased voltage inherently and unavoidably appearing on some non-selected pixels caused by the information writing signal voltages for selected pixels during the multiplexed driving is limited and reduced by properly selecting the combination of signal voltages applied to the signal electrodes and common writing and status holding signal voltages applied respectively to common signal electrodes of the optical switching element so that the optical switching element operates with an uniform picture quality and a high contrast, which is particularly suitable for an light shutter array for a line printer.

A multiplexed driving method of an optical switching element employing ferroelectric liquid crystal with a negative dielectric anisotropy of the present invention and including a plurality of signal electrodes and of common signal electrodes arranged in matrix and a ferroelectric liquid crystal layer disposed between the signal electrodes and the common signal electrodes so as to constitute a plurality of pixels at the respective facing portions of the signal electrodes and the common signal electrodes comprises:

a step of applying a multi polar signal pulse with a predetermined amplitude and duration on one of the common signal electrodes to select pixels covered thereby for information writing during a first information writing period, applying either a light transmitting signal voltage of first polarity or a light cutoff signal voltage of second polarity on the respective signal electrodes depending on a first set of input signals during the first information writing period, and applying an AC signal voltage with a predetermined amplitude and frequency on the other common electrodes during the first information writing period, whereby either first or second information writing voltages formed in combination with the multi polar signal pulse and the light transmitting signal voltage and the light cutoff signal voltage and being enough to determine one of the light transmitting and cutoff statuses are applied on the respective first selected pixels, and either first or second status holding voltages formed in combination with the AC signal voltage and the light transmitting signal voltage and the light cutoff signal voltage and being enough to hold the previously written statuses are applied on the respective first non-selected pixels; and a step of applying the multi polar signal pulse with the predetermined amplitude and duration on one of the other common signal electrodes to select pixels covered thereby for information writing during second information writing period, applying either the light transmitting signal voltage of first polarity or the light cutoff signal voltage of second polarity on the respective signal electrodes depending on a second set of input signals during the second information writing period, and applying the AC signal voltage with the predetermined amplitude and frequency on the common signal electrodes other than the one applied with the multi polar signal pulse during the second information writing period, whereby either the first or second information writing voltages formed in combination with the multi polar signal pulse and the light transmitting signal voltage and the light cutoff signal voltage and being enough to determine one of the light transmitting and cutoff statuses are applied on the respective second selected pixels, and either the first or second status holding voltages formed in combination with the AC signal voltage and the light transmitting signal voltage and the light cutoff signal voltage and being enough to hold the previously written statuses are applied on the respective second non-selected pixels.

The first and second information writing voltages applied on the selected pixels include a DC voltage pulse having a enough amplitude and duration to cause and determine the orientation of the ferroelectric liquid crystal molecules in the selected pixels.

The AC signal voltage included in the first and second status holding voltages applied on the non-selected pixels causes AC field stabilization effect on the ferroelectric liquid crystal molecules such that the molecules are forced to align parallel to the substrate surface of the optical switching element.

The amplitude of the AC signal voltage included in the first and second status holding voltages applied on the non-selected pixels is determined to be enough to prevent the reorientation of the ferroelectric liquid crystal molecules in the non-selected pixels by the bias voltage inherently included in the first and second status holding voltages.

The frequency of the AC signal voltage included in the first and second status holding voltages applied on the non-selected pixels is determined to be higher than the frequency at which the spontaneous polarization of the employed ferroelectric liquid crystal molecules respond but lower than the frequency at which the dielectric relaxation of the employed ferroelectric liquid crystal molecules occurs.

DESCRIPTION OF THE PREFERRED EMBODIMENTS

Figure 1:
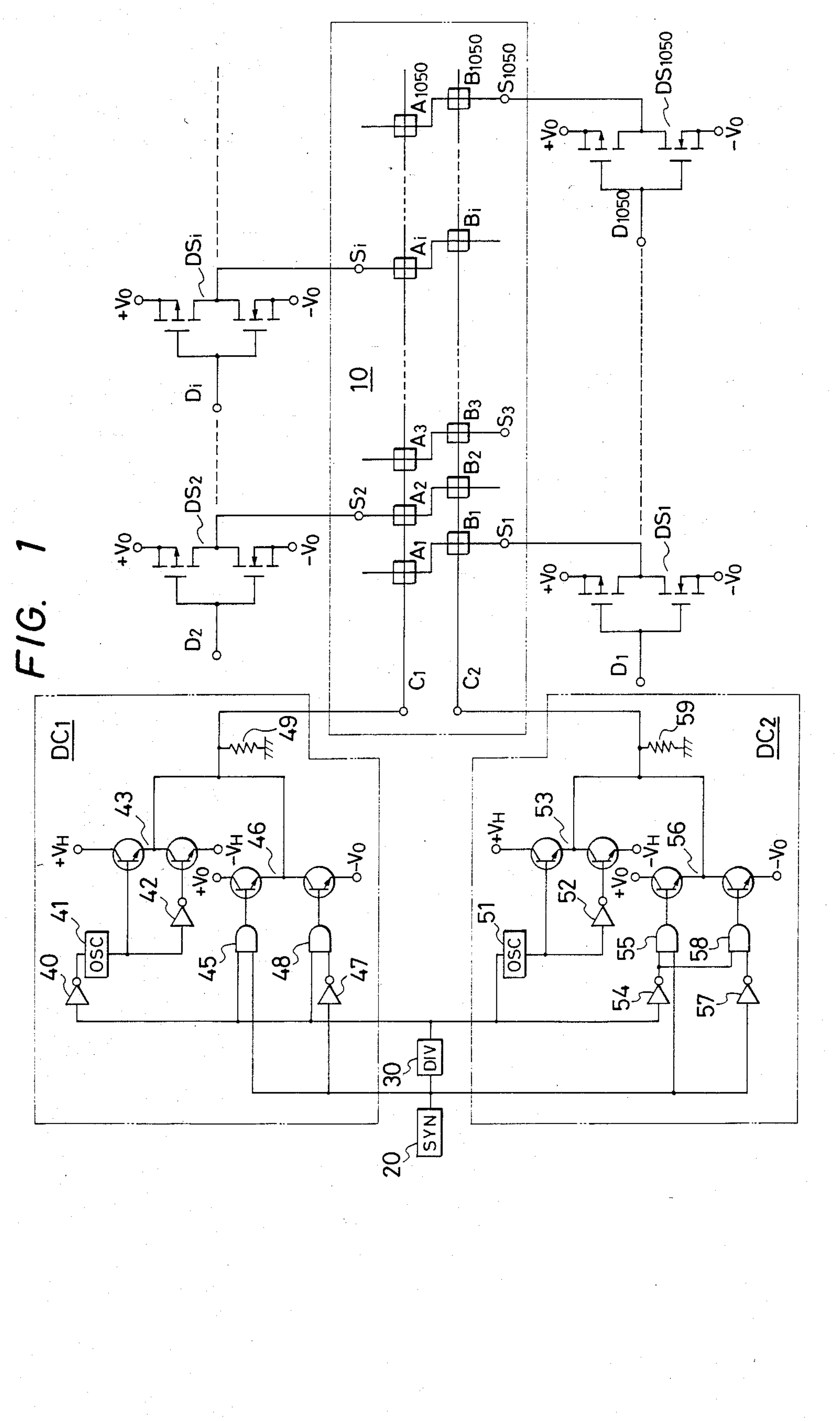
FIG. 1 shows one embodiment of a multiplexed driving circuit for an light shutter array for a line printer for carrying out the method of the present invention.

Referring now to FIG. 1, a light shutter array 10 for a line printer is formed of signal electrodes $S_1$, $S_2$, $S_3$, ----, Si, ----, $S_{1050}$, common signal electrodes $C_1$, $C_2$ and a ferroelectric liquid crystal layer (not shown) sandwiched between the signal electrodes and the common signal electrodes. The signal electrodes $S_1$, $S_2$, $S_3$, ----, Si, ----, $S_{1050}$ are arranged in zigzag. Pixels $A_1$, $A_2$, $A_3$, ----, Ai, ----, $A_{1050}$ are formed between the signal electrodes $S_1$, $S_2$, $S_3$, ----, Si, ----, $S_{1050}$ and the common signal electrode $C_1$, and pixels $B_1$, $B_2$, $B_3$, ----, Bi, ----, $B_{1050}$ are formed between the signal electrodes $S_1$, $S_2$, $S_3$, ----, Si, ----, $S_{1050}$ and the common signal electrodes $C_2$. The pixels $A_1$, $B_1$, $A_2$, $B_2$, $A_3$, $B_3$, ----, Ai, Bi, ----, $A_{1050}$, $B_{1050}$ cover information of one line for the line printer.

A first polarizer (not shown) is disposed on the one side of the light shutter array 10 and a second polarizer (not shown) is disposed on the other side of the array. The polarization axis of the first polarizer is arranged orthogonal to the polarization axis of the second polarizer so that the light shutter array operates in briefringence mode.

Output terminals of CMOS-IC drivers $DS_1$, $DS_2$, $DS_3$, ----, DSi, ----, $DS_{1050}$ are connected to the signal electrodes $S_1$, $S_2$, $S_3$, ----, Si, ----, $S_{1050}$ to drive the same. The CMOS-IC drivers $DS_1$, $DS_2$, $DS_3$, ----, DSi, ----, $DS_{1050}$ apply signal voltages to the respective signal electrodes in response to data signals applied to respective input terminals $D_1$, $D_2$, $D_3$, ----, Di, ----, $D_{1050}$ of the CMOS-IC drivers $DS_1$, $DS_2$, $DS_3$, ----, DSi, ----, $DS_{1050}$.

Output terminals of common signal electrode drivers $DC_1$ and $DC_2$ are connected respectively to the common signal electrodes $C_1$ and $C_2$ and also connected to the ground through resistors 49 and 59. A synchronous signal generating circuit 20 and a dividing signal generating circuit 30 are connected to the common signal electrode drivers $DC_1$ and $DC_2$ to control the alternate operation thereof.

Figure 2:
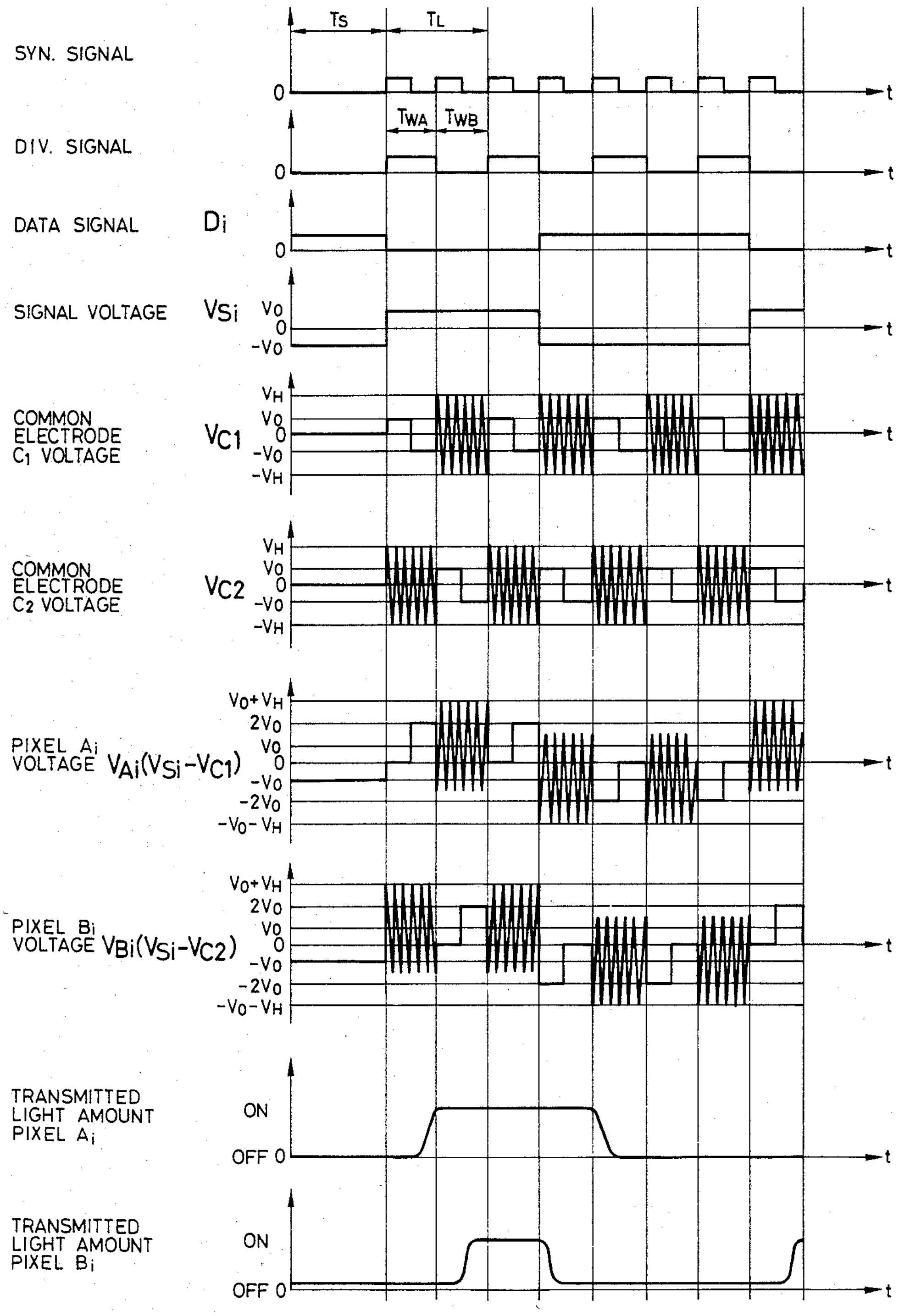
FIG. 2 shows voltage waveforms appearing at several portions of the multiplexed driving circuit shown in FIG. 1 and a resultant light shuttering when information writing and holding are carried out on pixels Ai and Bi of the light shutter array.

Operation of the multiplexed driving circuit for the light shutter array for the line printer is explained with reference to FIG. 2, which exemplifies a sequence of information writing and holding of four times on the pixels Ai and Bi covered by the signal electrode Si and a initialization of pixels Ai and Bi. Actually signal voltages are applied at once to all the signal electrodes $S_1$, $S_2$, $S_3$, ----, Si, ----, $S_{1050}$.

At first the light shutter array 10 is initialized during initializing period $T_s$, in that, all of the pixels are rendered to an OFF state through an application of $-5$ V DC voltage pulse with a duration of $T_s$ thereon by applying $-5$ V DC signal pulse with a duration of $T_s$, on all of the signal electrodes and applying zero signal voltage to the common signal electrodes $C_1$ and $C_2$.

During the first information writing period for the pixel Ai, $T_{WA}$, a NPN bipolar transistor 46 generates the bipolar signal pulse with 5 V ($V_o$) amplitude illustrated by the wave form of COMMON ELECTRODE $C_1$ VOLTAGE $V_{C1}$ through an operation of an AND gate 45 and an AND gate 48 with a NOT gate 47, both are connected respectively to the synchronous signal generating circuit 20 and the dividing signal generating circuit 30. The generated bipolar signal pulse is applied to the common signal electrode $C_1$.

During the same period, in that the first information writing period $T_{WA}$, a NPN bipolar transistor 53 generates the AC signal voltage of 20 V ($V_H$) and 10 kHz schematically illustrated by the wave form of COMMON ELECTRODE $C_2$ VOLTAGE $V_{C2}$ through an operation of an oscillator element 51 and a NOT gate 52 disposed between the NPN bipolar transistor 53 and the dividing signal generating circuit 30. The generated AC signal voltage is applied to the common signal electrode $C_2$.

Further during the same period, in that the first information writing period $T_{WA}$, since the data signal applied to the input terminal Di of the CMOS-IC driver DSi is low, the output signal of the CMOS-IC driver DSi is an unipolar pulse with an amplitude of 5 V (Vo) as illustrated in the waveforms of DATA SIGNAL Di and SIGNAL VOLTAGE Si.

As a result, a voltage pulse of 10 V (2 Vo) with half duration of $T_{WA}$ is applied on the pixel Ai to turn on the same through reorientation of the ferroelectric liquid crystal molecules in the pixel Ai as illustrated by the waveform of PIXEL Ai VOLTAGE $V_{Ai}$ and an AC voltage biased by the DC 5 V signal voltage is applied on the pixel Bi to hold the previous status, in that OFF state, as illustrated by the waveform of PIXEL Bi VOLTAGE $V_{Bi}$. Although the polarity of the DC bias on the pixel Bi is changed from that previously applied for initialization, the superposed AC voltage prevents reorientation of the ferroelectric liquid crystal molecules in the pixel Bi.

Secondly, during the first information writing period for pixel Bi, $T_{WB}$, in other words the first status holding period for pixel Ai, a NPN bipolar transistor 56 generates the bipolar signal pulse with 5 V (Vo) amplitude illustrated by the waveform of COMMON ELECTRODE $C_2$ VOLTAGE $V_{C2}$ through an operation of an AND gate 55 with a NOT gate 54 and an AND gate 58 with a NOT gate 57, both are connected respectively to the synchronous signal generating circuit 20 and the dividing signal generating circuit 30.

During the same period, in that the first information writing period $T_{WB}$, a NPN bipolar transistor 43 generates the AC signal voltage of 20 V (VH) and 10 kHz schematically illustrated by the waveform of COMMON ELECTRODE $C_1$ VOLTAGE $V_{C1}$ through an operation of an oscillator element 41 and NOT gates 40 and 42 disposed between the NPN bipolar transistor 43 and the dividing signal generating circuit 30.

Further during the same period, in that the first information writing period $T_{WB}$, since the data signal applied to the input terminal Di of the CMOS-IC driver DSi is low, the output signal of the CMOS-IC driver DSi is an unipolar pulse with an amplitude of 5 V (Vo) as illustrated in the waveforms of DATA SIGNAL Di and SIGNAL VOLTAGE Si like in the period $T_{WA}$.

As a result, a voltage pulse of 10 V (2 Vo) with half duration of $T_{WB}$ is applied on the pixel Bi to turn on the same through reorientation of the ferroelectric liquid crystal molecules in the pixel Bi as illustrated by the waveform of PIXEL Bi VOLTAGE $V_{Bi}$ and an AC voltage biased by the DC 5 V signal voltage is applied on the pixel Ai to hold the previous status, in that ON state, as illustrated by the waveform of PIXEL Ai VOLTAGE $V_{Ai}$.

$T_L$ is $T_{WA}+T_{WB}$, which is a period necessary to complete writing pixels for one line of a photosensitive drum for the line printer.

Although zero V period is included in the information writing period on pixels Ai and Bi as will be seen from the waveforms of PIXEL Ai VOLTAGE $V_{Ai}$ and PIXEL Bi VOLTAGE $V_{Bi}$, no substantial status change of refractive indexes (change in transmitted light amount) of pixels Ai and Bi were not observed.

Moreover although the polarity of bias voltage on pixel Ai during the second and fourth status holding periods for pixel Ai is inverted from that of the previous information writing voltage applied on the pixel Ai, no substantial status change of refractive index of the pixel Ai was observed, because the amplitude of the bias voltage is limited as well as the application of the AC voltage superposed on the bias voltage.

Figure 3:
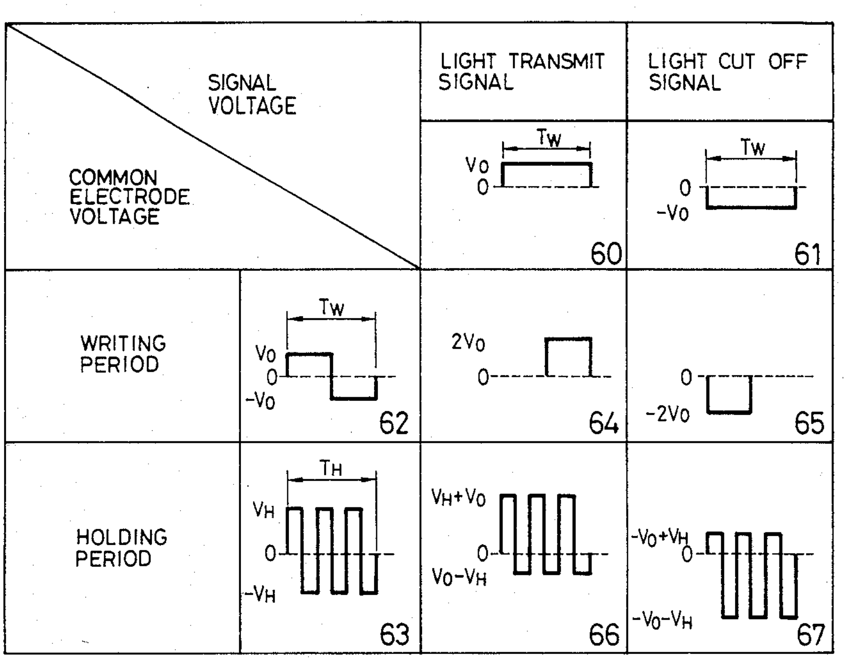
FIG. 3 shows one set of arranged signal voltage waveforms applied to signal electrodes and common signal electrodes of the light shutter array and resultant voltage waveforms appearing on a pixel of the light shutter array. The set of the arranged signal voltage waveforms and the resultant voltage waveforms shown in this FIG. 3 are also shown in FIG. 2.

Referring now to FIG. 3 which rearranges two kinds of signal voltage waveforms applied to the signal electrodes, two kinds of common signal voltage waveforms applied to the common signal electrodes and resultant voltage waveforms obtained and applied on selected and non-selected pixels. These voltage waveforms also appear in FIG. 2.

Either a light transmitting signal voltage pulse 60 with an amplitude +Vo and a duration $T_W$ or a light cutoff signal voltage pulse 61 with an amplitude −Vo and a duration $T_W$ is applied to the signal electrodes. A bipolar signal pulse 62 with an amplitude ±Vo and a total duration of $T_W$ is applied to one of the common signal electrodes which covers selected pixels on which information is desired to be written. An AC signal voltage 63 with an amplitude $\pm V_H$, preferably 20–30 V, a frequency of 5–30 kHz and a duration $T_H$ is applied to the other common signal electrodes which cover non-selected pixels to hold the status written previously thereon. The duration $T_W$ is same as the duration $T_H$, because the information writing period for the selected pixels covered by the one of the common signal electrodes is the status holding period for the non-selected pixels covered by the other common signal electrodes.

Either a DC voltage pulse 64 with an amplitude +2 Vo and a duration of $T_W/2$ or a DC voltage pulse 65 with an amplitude −2 Vo and a duration of $T_W/2$ is obtained depending on the combination of the signal voltage pulses 60 and 61 and the bipolar signal pulse 62. The DC voltage pulses 64 or 65 is applied on the selected pixels to determine the status thereof. Either an AC voltage 66 biased by the signal voltage pulse 60 or an AC voltage 67 biased by the signal voltage pulse 61 is obtained depending on the combination of the signal voltage pulses 60 and 61 and the AC signal voltage 63. The AC voltage 66 or 67 is applied on the non-selected pixels to hold the status thereof.

Figure 4:
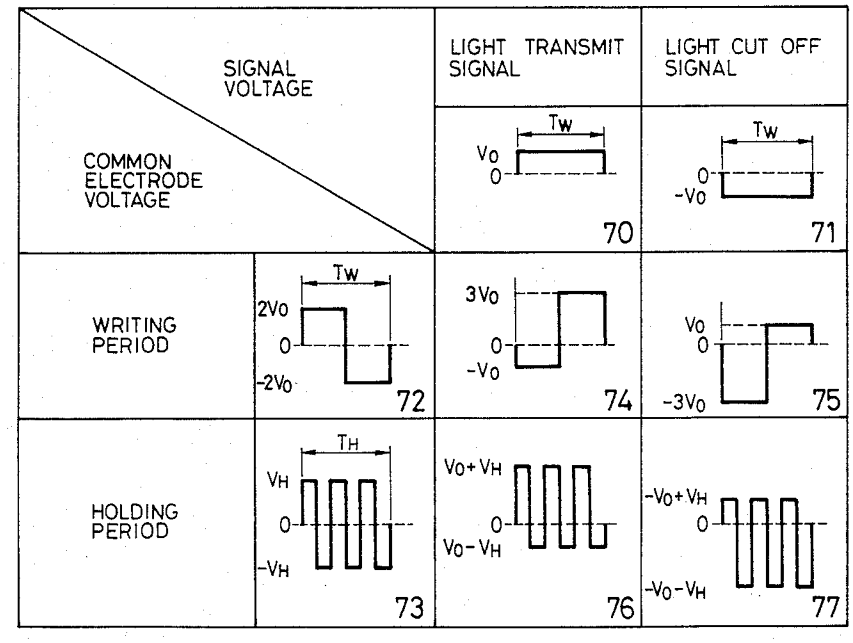
FIG. 4 shows another set of arranged signal voltage waveforms applicable to the signal electrodes and the common signal electrodes of the light shutter array for carrying out the present invention and the resultant voltage waveforms appearing on a pixel of the light shutter array.

FIG. 4 illustrates another example of a set of signal voltages applied to the signal electrodes, a set of common signal voltages applied to the common signal electrodes and the resultant voltages obtained and applied on selected and non-selected pixels.

The voltage waveforms of a light transmitting signal voltage pulse 70 and a light cutoff signal voltage pulse 71 are same as those of the light transmitting signal voltage pulse 60 and the light cutoff signal voltage pulse 61 as illustrated in FIG. 3. The common writing signal voltage, which is applied to one of the common signal electrodes covering the selected pixels, is a bipolar signal pulse 72 with an amplitude ±2 Vo and a total duration of $T_W$. The common status holding signal voltage, which is applied to the other of the common signal electrodes covering the non-selected pixels, is an AC signal voltage 73 same as the the AC signal voltage 63 illustrated in FIG. 3. The resultant voltages obtained and applied on the selected pixels are a bipolar pulse 74 with an amplitude of −Vo and +3 Vo and a total duration of $T_W$ and a bipolar pulse 75 with an amplitude of −3 Vo and +Vo and a total duration of $T_W$. The +Vo DC pulse included in the bipolar pulse 75 was observed not to cause any substantial change on the status of the pixel which was determined by the −3 Vo DC pulse included in the same bipolar pulse 75. The voltage waveforms of AC voltages 76 and 77 obtained and applied on the non-selected pixels are same as those of the AC voltages 66 and 67 as illustrated in FIG. 3.

Figure 5:
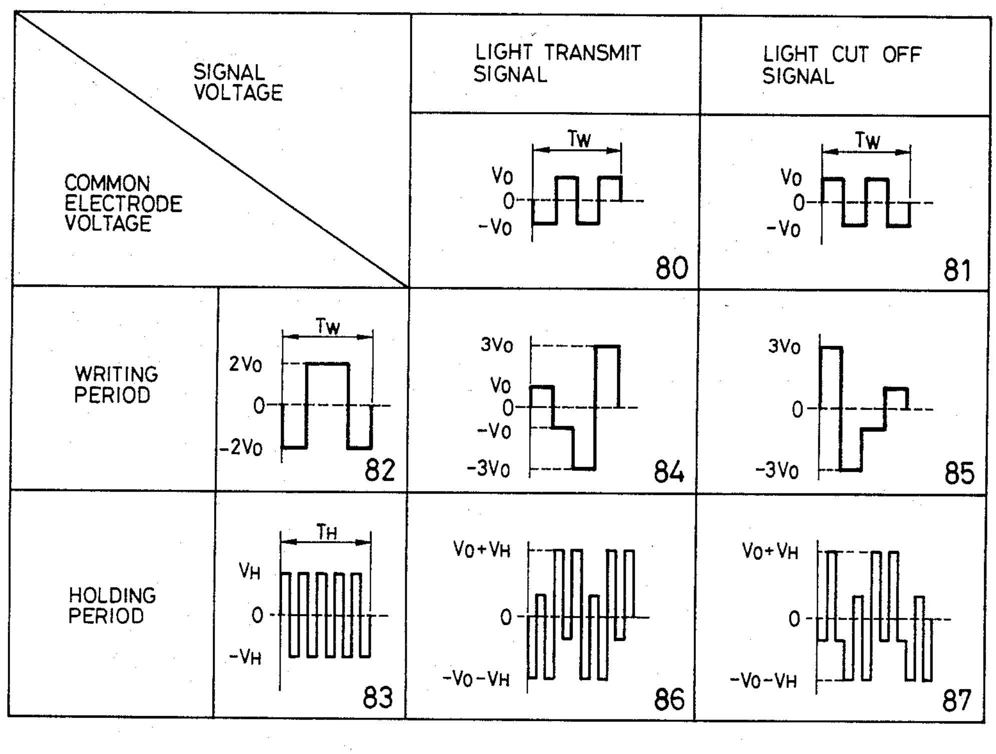
FIG. 5 shows still another set of arranged signal voltage waveforms applicable to the signal electrodes and the common signal electrodes of the light shutter array for carrying out the present invention and the resultant voltage waveforms appearing on a pixel of the light shutter array.

FIG. 5 illustrates still another example of a set of signal voltages applied to the signal electrodes, a set of common signal voltages applied to the common signal electrodes and the resultant voltages obtained and applied on selected and non-selected pixels.

The signal voltages applied to the signal electrodes are a four polar signal pulse 80 with an amplitude ±Vo and a total duration $T_W$ and another four polar signal pulse 81 with an amplitude ±Vo and a total duration $T_W$, another sense of polarity with the four polar signal pulse 80, in other words alternate signal voltage pulses. The common writing signal voltage is a three polar signal pulse 82 with an amplitude ±2 Vo and a total duration of $T_W$. The common status holding signal voltage is an AC signal voltage 83 same as the AC signal voltage 63 illustrated in FIG. 3. The resultant voltages obtained and applied on the selected pixels are one sense of four polar pulse 84 with an amplitude of ±Vo and ±3 Vo and a total duration of $T_W$ and another sense of four polar pulse 85 with an amplitude of ±Vo and ±3 Vo and a total duration of $T_W$. The +Vo DC pulse included in the four polar pulse 85 was observed not to cause any substantial change on the status of the pixel which was determined by the −3 Vo DC pulse included in the same four polar pulse 85. The resultant status holding voltages obtained and applied on the non-selected pixels are a first AC biased AC voltage 86 by the four polar signal pulse 80 and a second AC biased AC voltage 87 by the four polar signal pulse 81. Since the first and second AC voltages 86 and 87 are AC biased, the status holding effect is enhanced, in other words, the response of the spontaneous polarization of the ferroelectric liquid crystal molecules to an applied electric field is alternated so as not to change substantially the status of the non-selected pixels, so that the amplitude of the common status holding AC signal voltage 83 is reduced. The 3 Vo DC pulse width or duration included in the four polar pulse 84 and the −3 Vo DC pulse width or duration included in the four polar pulse 85, which determined the status of the selected pixel, are selected to be sufficiently large enough to cause reorientation of the ferroelectric liquid crystal molecules in the selected pixels.

We claim:

1. A multiplexed driving method of an light shuttering element employing ferroelectric liquid crystal with a negative dielectric anisotropy including a plurality of signal electrodes and of common signal electrodes arranged in matrix and a ferroelectric liquid crystal layer disposed between the signal electrodes and the common signal electrodes so as to constitute a plurality of pixels at the respective facing portions of the signal electrodes and the common signal electrodes comprises:

a step of applying a multi polar pulse with a predetermined amplitude and duration on one of the common signal electrodes to select pixels covered thereby for information writing during a first information writing period, applying either a light transmitting signal voltage of first polarity or a light cutoff signal voltage of second polarity on the respective signal electrodes depending on a first set of input signals during the first information writing period, and applying an AC voltage with a predetermined amplitude and frequency on the other common signal electrodes during the first information writing period, whereby either first or second information writing voltages formed in combination with the multi polar pulse and the light transmitting signal voltage and the light cutoff signal voltage and being enough to determine one of the light transmitting and cutoff statuses are applied on the respective first selected pixels, and either first or second status holding voltages formed in combination with the AC voltage and the light transmitting signal voltage and the light cutoff signal voltage and being enough to hold the previously written statuses are applied on the respective first non-selected pixels; and a step of applying the multi polar pulse with the predetermined amplitude and duration on another one of the common signal electrodes to select pixels covered thereby for information writing during a second information writing period, applying either the light transmitting signal voltage of first polarity or the light cutoff signal voltage of second polarity on the respective signal electrodes depending on a second set of input signals during the second information writing period and applying the AC voltage with the predetermined amplitude and frequency on the common signal electrodes other than the one applied with the multi polar pulse during the second information writing period, whereby either the first or second information writing voltages formed in combination with the multi polar pulse and the light transmitting signal voltage and the light cutoff signal voltage and being enough to determine one of the light transmitting and cutoff statuses are applied on the respective second selected pixels, and either the first or second status holding voltages formed in combination with the AC voltage and the light transmitting signal voltage and the light cutoff signal voltage and being enough to hold the previously written statuses are applied on the respective second non-selected pixels.

2. The multiplexed driving method of an optical switching element employing ferroelectric liquid crystal with a negative dielectric anisotropy according to claim 1 wherein the first and second status holding voltages include a bias voltage determined by either the light transmitting signal voltage or the light cutoff signal voltage having a smaller amplitude than those of the first and second information writing voltages.

3. The multiplexed driving method of an optical switching element employing ferroelectric liquid crystal with a negative dielectric anisotropy according to claim 2 wherein the bias voltage is a DC bias voltage.

4. The multiplexed driving method of an optical switching element employing ferroelectric liquid crystal with a negative dielectric anisotropy according to claim 2 wherein the bias voltage is an AC bias voltage.

5. The multiplexed driving method of an optical switching element employing ferroelectric liquid crystal with a negative dielectric anisotropy according to claim 1 wherein the first and second information writing voltages include a first pulse having an enough amplitude and duration to determine the orientation of the ferroelectric liquid crystal molecules in the selected pixels.

6. The multiplexed driving method of an optical switching element employing ferroelectric liquid crystal with a negative dielectric anisotropy according to claim 5 wherein the first and second information writing voltages further include a second pulse having opposite polarity from that of the first pulse and of an amplitude small enough not to cause reorientation of the ferroelectric liquid crystal molecules in the selected pixels.

7. The multiplexed driving method of an optical switching element employing ferroelectric liquid crystal with a negative dielectric anisotropy according to claim 1 wherein the light transmitting signal voltage of first polarity is a first unipolar pulse of one polarity with a predetermined amplitude, the light cutoff signal voltage of second polarity is a second unipolar pulse of the other polarity with the same predetermined amplitude as that of the first unipolar pulse and the multi polar pulse is a bipolar pulse with the same amplitude as those of the first and second unipolar pulses.

8. The multiplexed driving method of an optical switching element employing ferroelectric liquid crystal with a negative dielectric anisotropy according to claim 1 wherein the light transmitting signal voltage of first polarity is a first unipolar pulse of one polarity with a predetermined amplitude, the light cutoff signal voltage of second polarity is a second unipolar pulse of the other polarity with the same predetermined amplitude as that of the first unipolar pulse and the multi polar pulse is a bipolar pulse with an amplitude two times larger than those of the first and second unipolar pulses.

9. The multiplexed driving method of an optical switching element employing ferroelectric liquid crystal with a negative dielectric anisotropy according to claim 1 wherein, the the light transmitting signal voltage of first polarity is a first four polar pulse of one sense of polarity with a predetermined amplitude, the light cutoff signal voltage of second polarity is a second four polar pulse of the other sense of polarity with the same predetermined amplitude as that of the first four polar pulse and the multi polar pulse is a three polar pulse with an amplitude two times larger than those of the first and second four polar pulses.

10. The multiplexed driving method of an optical switching element employing ferroelectric liquid crystal with a negative dielectric anisotropy according to claim 1 further comprises a step of initializing all of the pixels before the information writing thereon by applying an initializing voltage on all of the pixels so that ferroelectric liquid crystal molecules in all of the pixels orient to substantially a same direction.

* * * * *

Notice of Adverse Decisions in Interference

In Interference No. 102,326, involving Patent No. 4,746,196, T. Umeda, T. Nagata, Y. Simazaki, T. Igawa and Y. Hori, MULTIPLEXED DRIVING METHOD FOR AN OPTICAL SWITCHING ELEMENT EMPLOYING FERROELECTRIC LIQUID CRYSTAL, final judgment adverse to the patentees was rendered Feb. 6, 1991, as to claims 1-10.

(*Official Gazette September 3, 1991.*)